(12) United States Patent
Song et al.

(10) Patent No.: US 8,555,093 B2
(45) Date of Patent: Oct. 8, 2013

(54) COMMUNICATION DEVICE AND COMMUNICATION DEVICE CONTROL METHOD

(75) Inventors: Hainian Song, Nagoya (JP); Tomoaki Ohara, Nagoya (JP); Daisuke Yamada, Nagoya (JP)

(73) Assignee: Buffalo Inc., Nagoya-shi (JP)

( * ) Notice: Subject to any disclaimer, the term of this patent is extended or adjusted under 35 U.S.C. 154(b) by 154 days.

(21) Appl. No.: 13/106,886

(22) Filed: May 13, 2011

(65) Prior Publication Data

US 2011/0283132 A1 Nov. 17, 2011

(30) Foreign Application Priority Data

May 14, 2010 (JP) ................................. 2010-111790

(51) Int. Cl.
*G06F 1/00* (2006.01)
(52) U.S. Cl.
USPC ............................................ 713/300; 702/63
(58) Field of Classification Search
USPC .............................. 713/300, 320; 702/63, 103
See application file for complete search history.

(56) References Cited

U.S. PATENT DOCUMENTS

| | | | | |
|---|---|---|---|---|
| 6,472,848 B2* | 10/2002 | Stryker et al. | ................. | 320/135 |
| 7,024,574 B2* | 4/2006 | Odaohhara et al. | ........... | 713/324 |
| 7,225,086 B2* | 5/2007 | Naitoh et al. | ................... | 702/57 |
| 7,506,183 B2* | 3/2009 | Araya | ........................... | 713/300 |
| 7,783,396 B2* | 8/2010 | Arita et al. | ....................... | 701/22 |
| 2002/0079866 A1 | 6/2002 | Odaohhara | | |
| 2004/0143686 A1* | 7/2004 | Morita et al. | ..................... | 710/1 |
| 2006/0241826 A1* | 10/2006 | Ishishita et al. | ................. | 701/22 |
| 2008/0234956 A1* | 9/2008 | Mizuno et al. | ................. | 702/63 |
| 2009/0124299 A1 | 5/2009 | Suzuki et al. | | |
| 2010/0318250 A1* | 12/2010 | Mitsutani | ........................ | 701/22 |
| 2011/0138196 A1* | 6/2011 | Magnuson et al. | ........... | 713/300 |

FOREIGN PATENT DOCUMENTS

| | | |
|---|---|---|
| CN | 2572645 Y | 9/2003 |
| CN | 101431547 A | 5/2009 |

(Continued)

OTHER PUBLICATIONS

Chinese Office Action issued Jun. 26, 2013, in Patent Application No. 201110126487.4 (English translation only).

*Primary Examiner* — Mark Connolly
(74) *Attorney, Agent, or Firm* — Oblon, Spivak, McClelland, Maier & Neustadt, L.L.P.

(57) ABSTRACT

Provided is a communication device for utilization in a communication network. The communication device includes a communication process section for controlling communications in the communication network, a battery for supplying power to the communication process section, a battery control section for controlling supplying of power to the battery, a sub-board temperature detection section for detecting temperature of a battery housing section, and a temperature control section for, (A) when charging of the battery is underway and the temperature detected by the sub-board temperature detection section is outside a predetermined first charging-temperature range, controlling the battery control section to halt the charging of the battery, and, (B) when supplying of power from the battery to the communication process section is underway and the temperature detected by the sub-board temperature detection section is outside a predetermined first discharging-temperature range, halting the supplying of power from the battery to the communication process section.

6 Claims, 9 Drawing Sheets

(56) References Cited

FOREIGN PATENT DOCUMENTS

| JP | H06-161587 | A |   | 6/1994 |
|----|------------|---|---|--------|
| JP | 2002-163038 | A |   | 6/2002 |
| JP | 2003-511950 | A |   | 3/2003 |
| JP | 2003-174720 | A |   | 6/2003 |
| JP | 2005-142907 | A |   | 6/2005 |
| JP | 2009-117317 | A |   | 5/2009 |
| JP | 2010176530 | A | * | 8/2010 |

* cited by examiner

FIG. 3
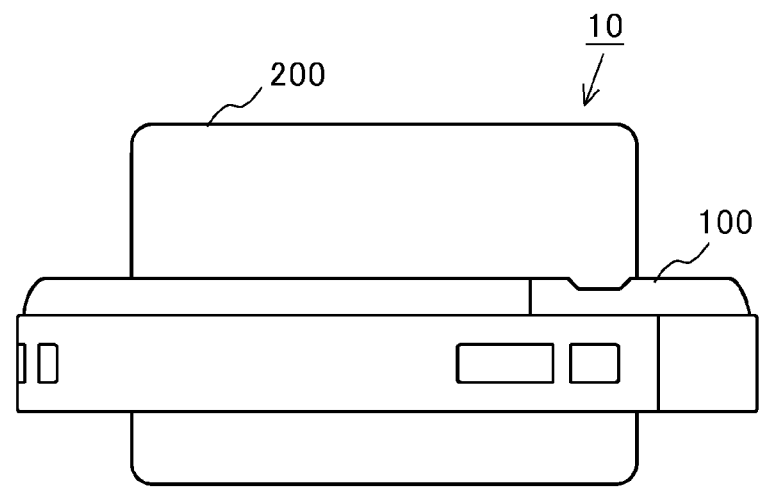
(A)
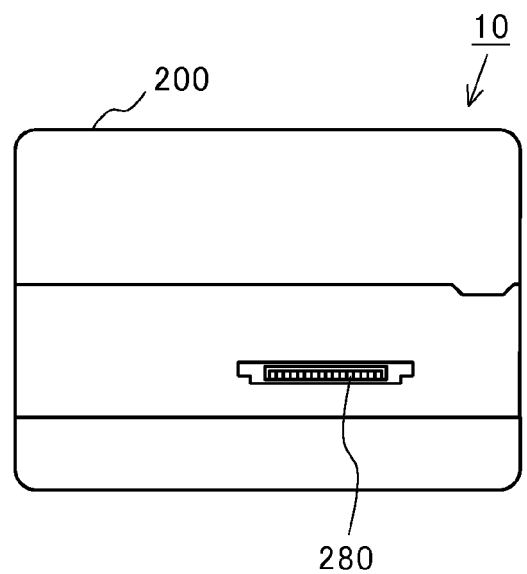
(B)

COMMUNICATION DEVICE AND COMMUNICATION DEVICE CONTROL METHOD

CROSS REFERENCE TO RELATED APPLICATION

The disclosure of Japanese Patent Application No. 2010-111790, filed on May 14, 2010, is incorporated herein by reference.

BACKGROUND OF THE INVENTION

1. Field of the Invention

The present invention relates to communication devices and to methods of controlling communication devices.

2. Description of the Background Art

Access points are widely used as wireless communication devices at homes or in offices in order to connect wireless or wired LAN (Local Area Network) stations such as personal computers, game machines, and the like to other networks (for example, refer to Japanese Laid-Open Patent Publication No. 2005-142907). Hereinafter, stations that are not access points and conduct wireless or wired communications with access points as clients are simply referred to as stations.

However, with conventional access points, for example, an amount of heat generation can increase during a long-term use, and the generation of heat can influence the access points. Thus, for the conventional access points, there is still room for improvements with regard to stability against the generation of heat. In addition, such problem is not limited to wireless communication devices that are used as access points, but also is a common problem for all communication devices that include control circuits and batteries.

SUMMARY OF THE INVENTION

The present invention is devised in order to solve the problem described above, and an objective of the present invention is to improve the stability against the generation of heat in communication devices.

The present invention attained as a configuration or an application example described in the following can solve at least one part of the problem described above.

One configuration is a communication device used in a communication network, the communication device comprising: a communication process section for controlling communications in the communication network; a battery for supplying power to the communication process section; a battery control section for controlling the supplying of power to the battery; a first temperature detection section for detecting temperature of a battery housing section housing the battery; and a temperature control section for, (A) when the battery is being charged and a temperature detected by the first temperature detection section is not within a predetermined first charging-temperature range, controlling the battery control section to halt the charging of the battery, and, (B) when power is supplied from the battery to the communication process section and the temperature detected by the first temperature detection section is not within a predetermined first discharging-temperature range, halting the supplying of power from the battery to the communication process section.

With the configuration described above, when the temperature of the housing section that houses the battery is not within the first discharging-temperature range while the battery is being charged, the charging of the battery can be halted; and when the power is supplied from the battery to the communication process section and the temperature of the housing section that houses the battery is not within the predetermined range, the supplying of power to the communication process section can be halted. Therefore, a temperature increase of a communication device main unit can be suppressed and functional deterioration and damage to the communication device can be prevented. As a result, an operation stability of the communication device against a generation of heat can be improved.

Furthermore, the communication device according to the present invention preferably further comprises a battery temperature detection section that detects the temperature of the battery, and, when the battery is being charged and the temperature detected by the battery temperature detection section is not within a predetermined second charging-temperature range, the battery control section preferably halts the charging of the battery.

With the configuration described above, when the temperature of the battery is not within the predetermined range while the battery is being charged, the charging of the battery can be halted. Therefore, discharging and charging states of the battery can be controlled not only based on the temperature of the housing section that houses the battery but also based on the temperature of the battery itself. As a result, the operation stability of the communication device against the generation of heat can be further improved.

Furthermore, the communication device according to the present invention preferably further comprises a third temperature detection section for detecting the temperature of a housing section housing a board including the communication process section, and, when power is supplied from the battery to the communication process section and the temperature detected by the third temperature detection section is not within the predetermined second discharging-temperature range, the temperature control section preferably halts the supplying of power from the battery to the communication process section.

With the configuration described above, when the temperature of the housing section that houses the communication process section is not within the predetermined range while power is supplied from the battery to the communication process section, discharging of the battery can be halted. Therefore, the discharging and charging states of the battery can be controlled not only based on the temperature of the housing section housing the battery but also based on the temperature of the communication process section. As a result, the operation stability of the communication device against the generation of heat can be further improved.

Furthermore, in the communication device according to the present invention, a first temperature detection section is preferably disposed on a sub-board on which a connection terminal connected to the battery is formed, and a third temperature detection section is preferably disposed at an end portion of the mainboard on which electronic parts including the communication process section are disposed.

With the configuration described above, the first temperature detection section can be disposed in the vicinity of the battery, and the third temperature detection section can be distanced away from the communication process section. As a result, the operation stability of the communication device against the generation of heat can be improved with more certainty.

Furthermore, in the communication device according to the present invention, when power is supplied from the battery to the communication process section and the temperature detected by the first temperature detection section is not within a predetermined third discharging-temperature range, the temperature control section preferably lowers a clock frequency of the communication process section; and when power is supplied from the battery to the communication process section and the temperature detected by the first temperature detection section is not within a fourth discharging-temperature range that is predetermined so as to include the third discharging-temperature range, the temperature control section preferably halts the supplying of power from the battery to the communication process section.

With the configuration described above, while power is supplied from the battery to the communication process section, when the temperature of the housing section that houses the battery is not within the third discharging-temperature range, the clock frequency of the communication process section can be lowered, and when the temperature is not within the fourth discharging-temperature range, discharging of the battery can be halted. Therefore, while continuing a communication process of the communication device as long as possible, when a stable operation becomes difficult due to the generation of heat, the operation can be halted in order to prevent heat damage beforehand. As a result, the operation stability of the communication device against the generation of heat can be improved.

Furthermore, the communication device according to the present invention preferably further comprises a wireless communication interface for conducting wireless communications in a wireless communication network, wherein when power is supplied from the battery to the communication process section and the temperature detected by the first temperature detection section is not within the predetermined third discharging-temperature range, the temperature control section preferably reduces an output of a wireless signal outputted from the wireless communication interface, and when power is supplied from the battery to the communication process section and the temperature detected by the first temperature detection section is not within the fourth discharging-temperature range predetermined so as to include the third discharging-temperature range, the temperature control section preferably halts the supplying of power from the battery to the communication process section.

With the configuration described above, while power is supplied from the battery to the communication process section, when the temperature of the housing section housing the battery is not within the third discharging-temperature range, the wireless output of the wireless communication interface can be reduced, and when the temperature is not within the fourth discharging-temperature range, discharging of the battery can be halted. Therefore, while continuing a communication process of the communication device as long as possible, when a stable operation becomes difficult due to the generation of heat, the operation can be halted in order to prevent heat damage beforehand. As a result, the operation stability of the communication device against the generation of heat can be improved.

It should be understood that the present invention can be achieved in various modes, and examples thereof include communication devices such as modems, routers, and mobile phones, auxiliary storage devices such as hard disk drives and DVD-ROM drives, output devices such as printers and displays, input devices such as scanners and tablets, and the like. In addition, the present invention can be achieved in modes such as methods for controlling these devices, computer programs for achieving the methods or functions of the devices, and storage media having stored therein the computer programs.

As one example, the present invention is applicable for a use in a communication device or the like for conducting, in a communication network, communications including wireless communications. These and other objectives, features, aspects, and advantages of the present invention will become more apparent from the following detailed description of the present invention when taken in conjunction with the accompanying drawings.

BRIEF DESCRIPTION OF THE DRAWINGS

FIG. 1A and FIG. 1B are diagrams illustrating the configuration of a wireless communication device main unit and cradle in embodiments of the present invention, wherein FIG. 1A illustrates the front side, and FIG. 1B the back side, of the device;

FIG. 2A and FIG. 2B are diagrams illustrating the configuration of the wireless communication device main unit and cradle in embodiments of the present invention, wherein FIG. 2A illustrates one lateral side, and FIG. 2B the other lateral side, of the device;

FIG. 3A and FIG. 3B are diagrams illustrating the configuration of the wireless communication device main unit and cradle in embodiments of the present invention, wherein FIG. 3A is an overhead view of the main unit as connected into the cradle, and FIG. 3B is a view of the cradle with the main unit removed;

DESCRIPTION OF THE PREFERRED EMBODIMENTS

Embodiments of the present invention will be described next.

Figure 1:
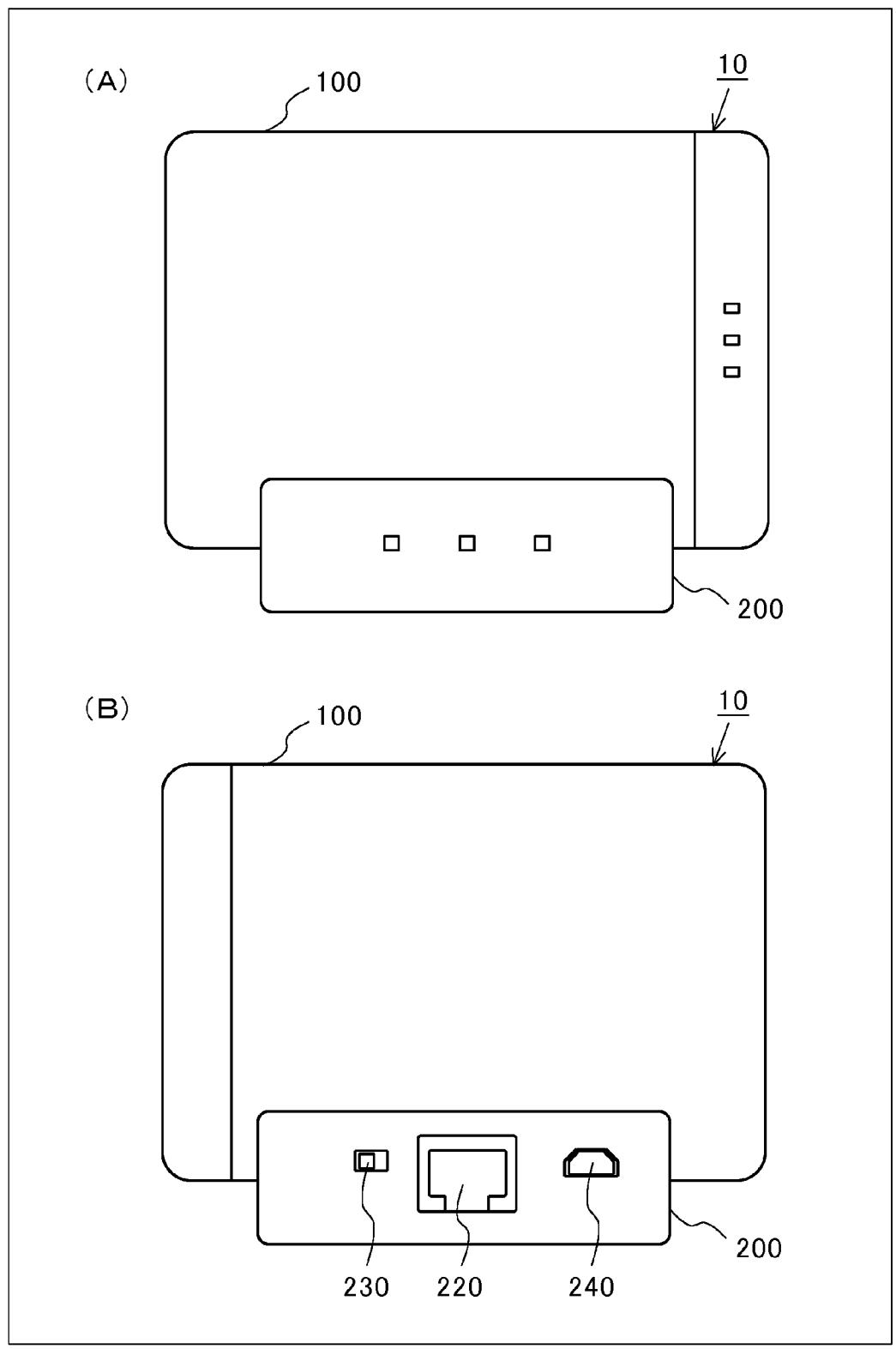
Figure 2:
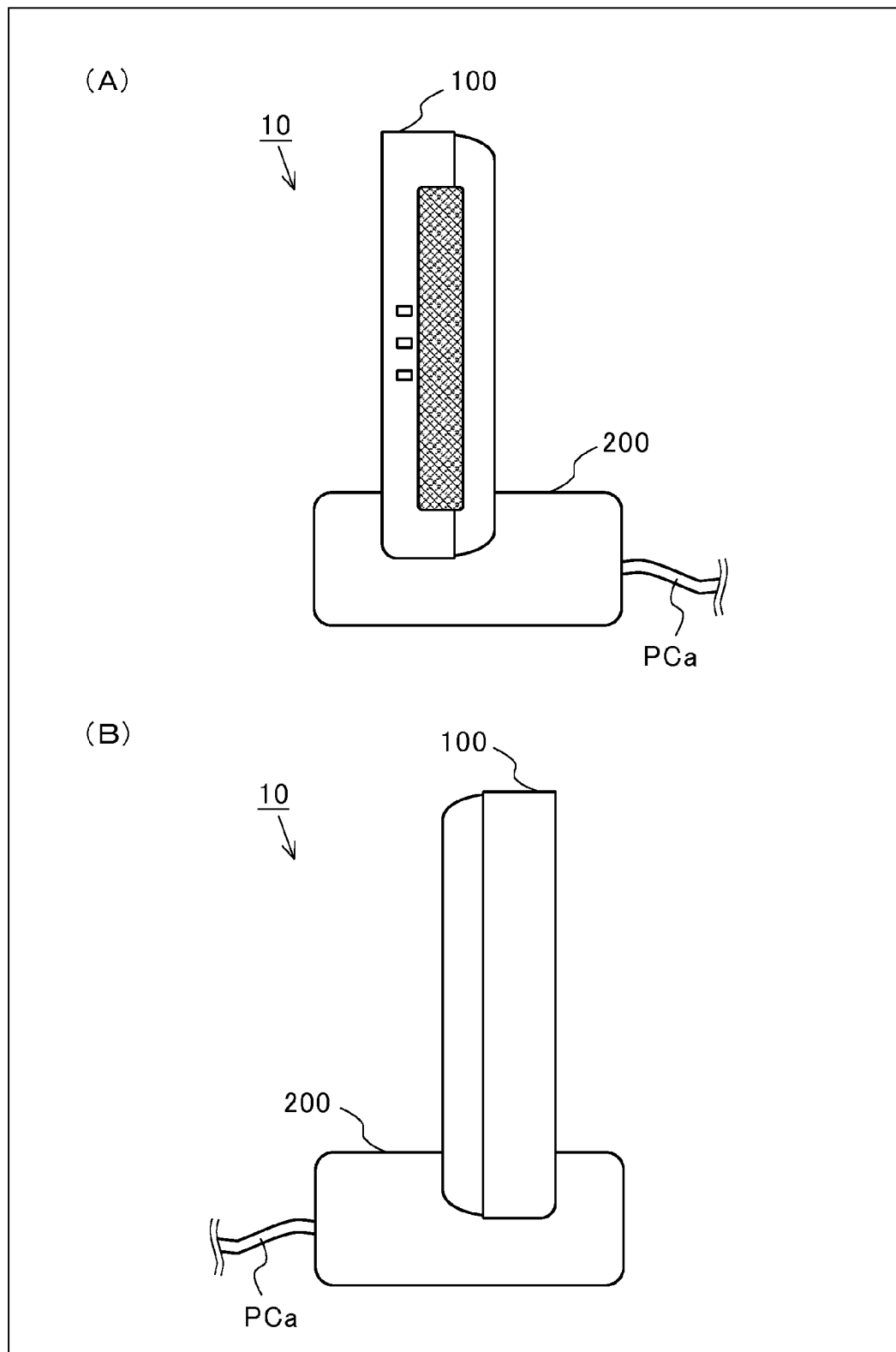
Figure 4:
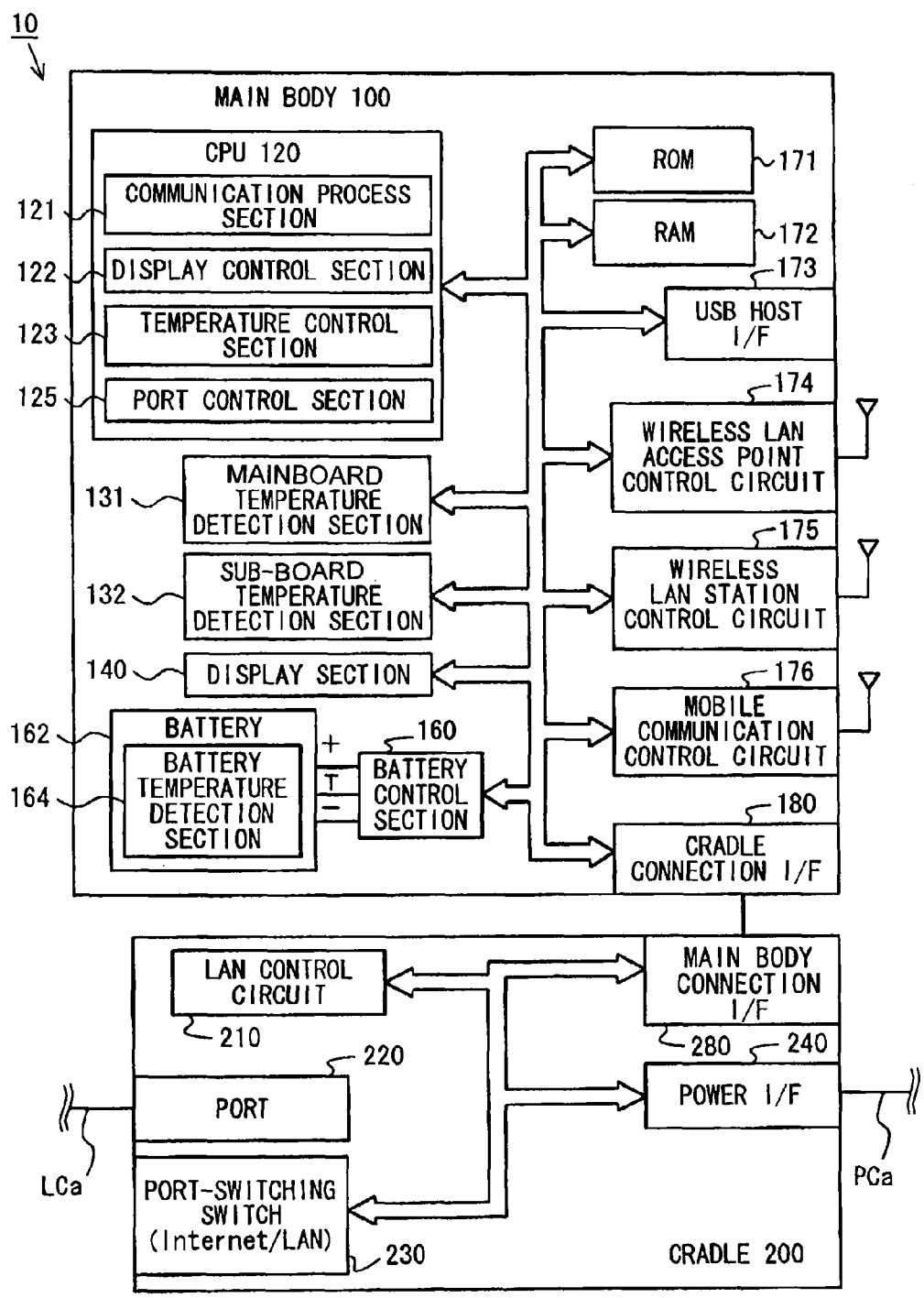
FIG. 4 is a functional block configuration diagram of the wireless communication device in embodiments of the present invention.

A configuration of a communication device 10 according to a first embodiment of the present invention will be described. FIG. 1 to FIG. 4 are diagrams schematically illustrating the configuration of the communication device 10 in one embodiment of the present invention. FIG. 1A and FIG. 1B respectively show external configurations the front surface and the back surface of the communication device 10. FIG. 2A and FIG. 2B respectively show external configurations of a side surface and the other side surface of the communication device 10. FIG. 3A shows the external configuration of the upper surface of the communication device 10. FIG. 3B shows the external configuration of the upper surface of a cradle 200 included in the communication device 10. Furthermore, FIG. 4 shows a functional block configuration of the communication device 10.

The communication device 10 includes a main unit 100 and the cradle 200, which are connectable to (removable from) each other. The main unit 100 is a small and light weight portable type device, and, by itself, has a wireless communication function. The cradle 200 provides various functions for the main unit 100 when connected to the main unit 100. In addition, the cradle 200 also functions as a stand on which the main unit 100 is placed.

As shown in FIG. 1B, FIG. 3B, and FIG. 4, the cradle 200 includes a port 220 conforming to, for example, IEEE (the Institute of Electrical and Electronics Engineers) standard 802.3/3u, a port-switching switch 230 for switching functions of the port 220, a power interface (I/F) 240 to which a power cable PCa is connected, a main unit connection interface (I/F) 280 used for connection with the main unit 100, and a LAN control circuit 210 for controlling data transmission via the port 220 in conformance with a predetermined network protocol (for example, Ethernet (registered trademark)). In addition, the cradle 200 has indicator lamps indicating operating states of the communication device 10.

The port-switching switch 230 can be switched into either an "Internet" state or a "LAN" state. In a state in which the port-switching switch 230 is switched to "Internet," the port 220 functions as an Internet side (external network side) port under control of a port control section 125. Furthermore, in a state in which the port-switching switch 230 is switched to "LAN," the port 220 functions as a local network side (LAN side, internal network side) port under the control of the port control section 125.

The main unit connection interface 280 functions, for example, as a USB device controller, and conducts, in conformance with the USB (Universal Serial Bus) standard, exchange of information such as communication data, various control data, and the like with the main unit 100 when the cradle 200 is connected to the main unit 100. In addition, the power interface 240 supplies power from the power cable PCa to the main unit 100 via the main unit connection interface 280 when the cradle 200 is connected to the main unit 100.

As shown in FIG. 4, the main unit 100 includes a CPU (Central Processing Unit) 120, which is a processor, a mainboard temperature detection section 131 that is disposed on a later described mainboard and that detects the temperature of the mainboard and its environs, a sub-board temperature detection section 132 that is disposed on a later described sub-board and that detects the temperature of the sub-board and its environs, a display section 140 for indicating the operational state of the communication device 10 with the indicator lamps, a battery 162 as a secondary (rechargeable) cell, a battery control section 160 for controlling charging and discharging of the battery 162, a ROM (Read Only Memory) 171, a RAM (Random Access Memory) 172, a USB device interface (I/F) 173 for connection with USB devices, a wireless LAN access point control circuit 174, a wireless LAN station control circuit 175, a mobile communication control circuit 176, and a cradle connection interface (I/F) 180 for connecting the main unit 100 with the cradle 200.

The battery 162 is, for example, a secondary cell such as a lithium-ion battery, and is charged by power supplied from the cradle 200 under control of the battery control section 160 when the main unit 100 is connected to the cradle 200. And when the main unit 100 is not connected to the cradle 200, the battery 162 by discharging supplies power for the operation of the main unit 100. Furthermore, even when the main unit 100 is connected to the cradle 200, if power is not supplied from the cradle 200 to the main unit 100 due to disconnection of the power cable PCa, for example, discharging of the battery 162 supplies power for the operation of the main unit 100 and the cradle 200.

The battery 162 includes a battery temperature detection section 164 for detecting the temperature of the battery 162. In addition to plus and minus terminals via which charging/discharging takes place, the battery 162 includes a terminal T connected to the battery temperature detection section 164.

The mainboard temperature detection section 131, the sub-board temperature detection section 132, and the battery temperature detection section 164 can also be formed from an NTC thermistor, a PTC thermistor, a temperature sensor IC, a fuse, or the like. Furthermore, the mainboard temperature detection section 131, the sub-board temperature detection section 132, and the battery temperature detection section 164 can also be formed from a contact type temperature sensor or a non-contact type temperature sensor. In the present embodiment, the temperature of the battery 162 detected by the battery temperature detection section 164 is referred to as a temperature T3 (° C.).

The battery control section 160 is a device that includes a so-called charger IC. The battery control section 160 is electrically connected to the plus terminal, the minus terminal, and the terminal T of the battery 162. The charger IC receives a supply of power from an external power supply (not shown), and stores the supplied power in the battery 162. By detecting signals and changes in a resistance value via the terminal T, the battery control section 160 acquires information related to the temperature T3 detected by the battery temperature detection section 164. When charging the battery 162, if the temperature T3 acquired from the battery temperature detection section 164 is not within a predetermined second charging-temperature range, the battery control section 160 halts supplying power to the battery 162. The second charging-temperature range can be set to a range of choice. For example, the second charging-temperature range may be set at around 0° C. to 50° C.

The wireless LAN access point control circuit 174 includes a modulator, an amplifier, and an antenna, and conducts wireless communications with an access point on a WAN (for example, public wireless LAN) side, as an interface having an access point function for a wireless LAN conforming to, for example, IEEE 802.11b/g standard. The wireless LAN station control circuit 175 similarly includes a modulator, an amplifier, and an antenna, and conducts, as a station interface by being a client of a wireless LAN conforming to, for example, IEEE 802.11a/b/g standard, wireless communications with stations (for example, personal computers and game machines) that are clients of the wireless LAN. The mobile communication control circuit 176 similarly includes a modulator, an amplifier, and an antenna, and conducts wireless communications with a base station of a mobile communication network as an interface of user equipment for mobile communications conforming to, for example, the 3G/HSPA (Third Generation/High Speed Packet Access) standard. As described above, the main unit 100 of the present embodiment can conduct wireless communications in different wireless communication networks. The wireless LAN access point control circuit 174, the wireless LAN station control circuit 175, and the mobile communication control circuit 176 respectively have multiple wireless communication interfaces conforming to respective standards.

The cradle connection interface 180 functions as a USB host controller, and conducts exchange of information with the cradle 200 in conformance with the USB standard when the main unit 100 is connected to the cradle 200. In addition, when the main unit 100 is connected to the cradle 200, the cradle connection interface 180 transfers power supplied from the cradle 200 to the battery control section 160 via the main unit connection interface 280.

By loading the RAM 172 with firmware and computer programs stored in the ROM 171 and executing the firmware and computer programs, the CPU 120 controls each section of the communication device 10, and functions as a communication process section 121, a display control section 122, a temperature control section 123, and the port control section 125. The communication process section 121 controls each of the wireless communication interfaces (the wireless LAN access point control circuit 174, the wireless LAN station control circuit 175, and the mobile communication control circuit 176), and conducts data transfer between the communication device 10 and a communication device connected to the communication device 10. Functions of the display control section 122 and the temperature control section 123 will be described later. The temperature control section may be configured by hardware other than the CPU 120.

Figure 5:
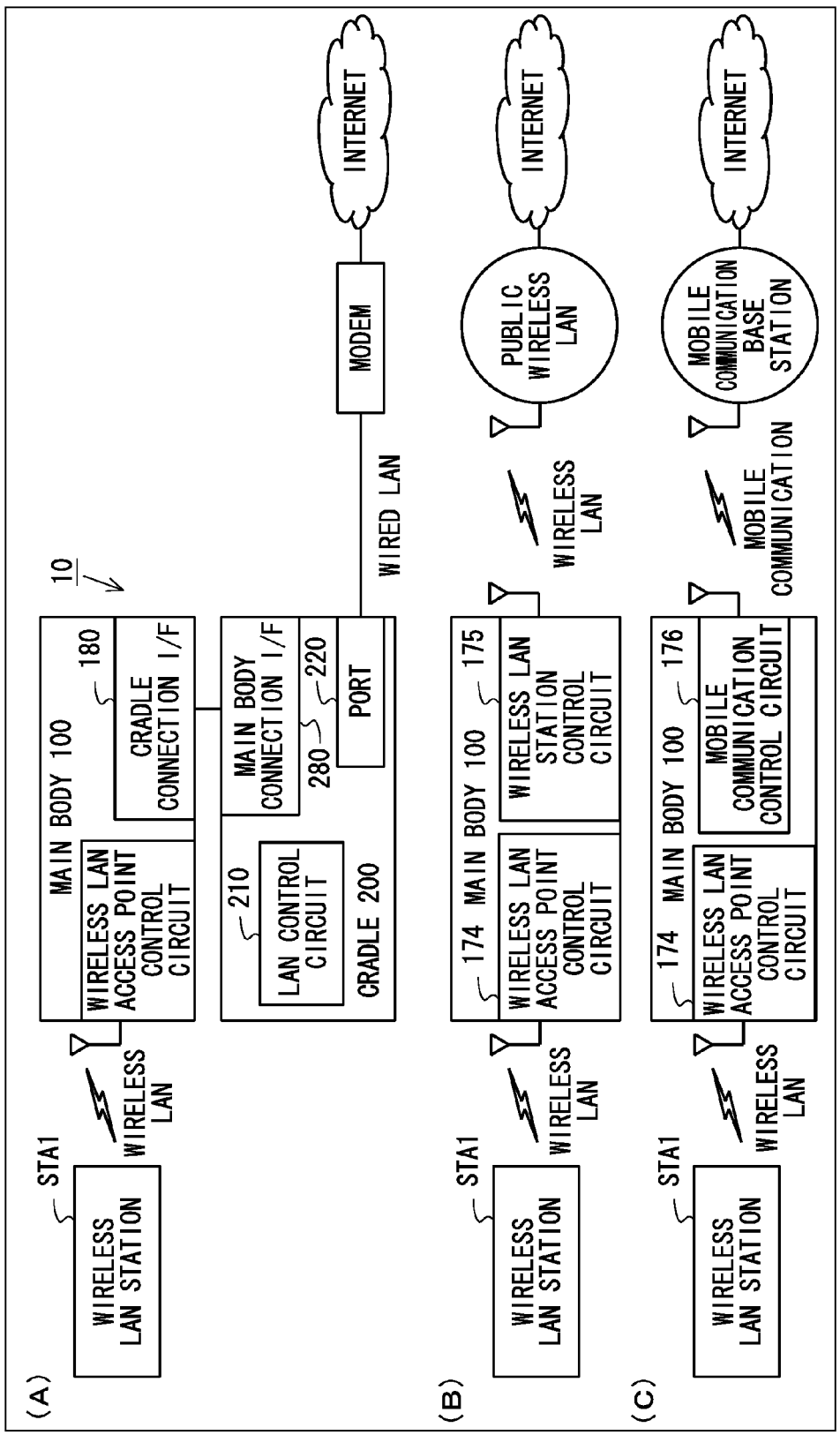
FIG. 5A, FIG. 5B, and FIG. 5C are diagrams representing three different connection modes for wireless communications by wireless communication devices involving embodiments of the present invention.
Figure 6:
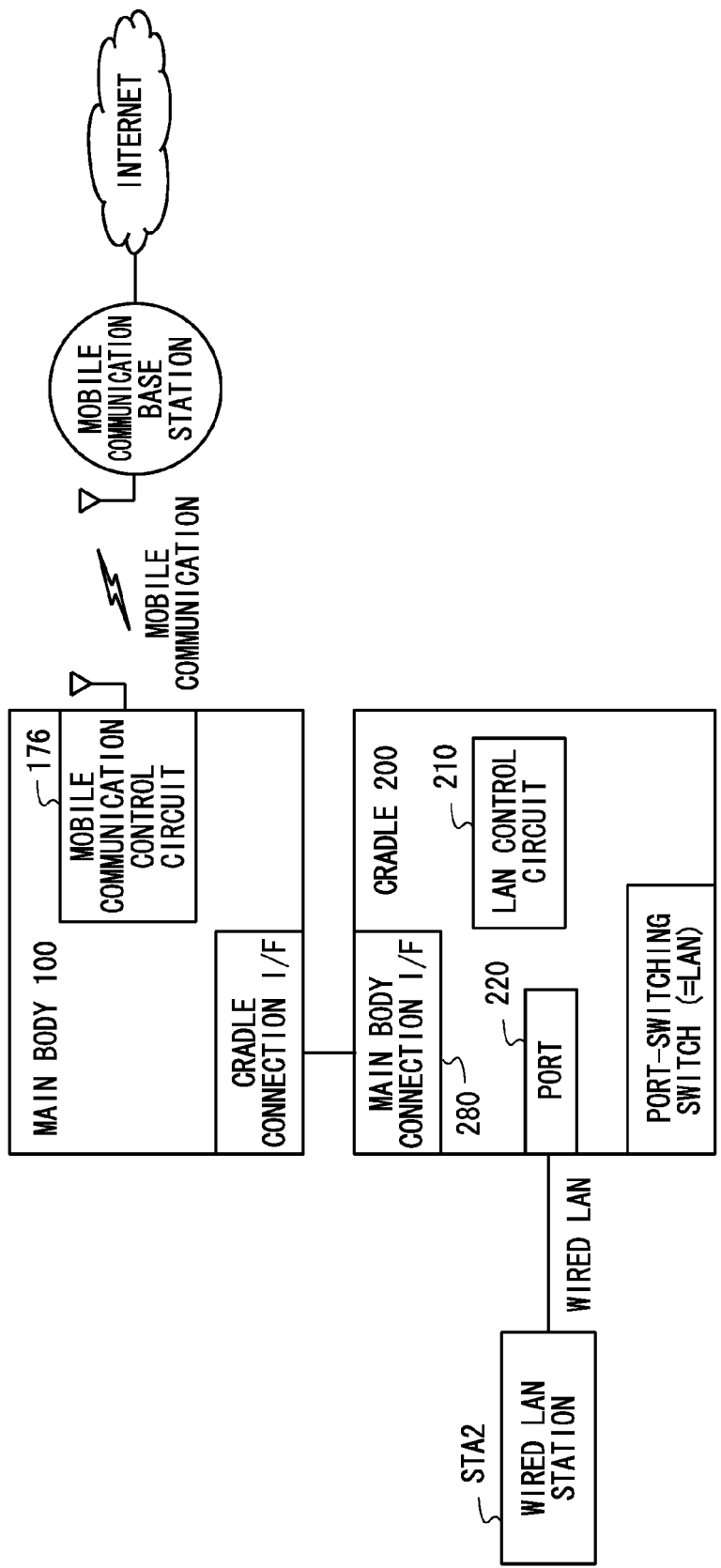
FIG. 6 is a diagram representing a fourth different connection mode for wireless communications by wireless communication devices involving embodiments of the present invention.

The communication device 10 according to the present embodiment can conduct wireless communications using various connection modes. FIG. 5 and FIG. 6 are diagrams illustrating various connection modes used when conducting wireless communications by the communication device 10 according to the present embodiment. As shown in FIG. 5A, in a first connection mode, the main unit 100 is connected to the cradle 200, and the LAN port 220 of the cradle 200 is connected to one end of a LAN cable (network cable) having the other end connected to, for example, an FTTH optical line terminating device (Optical Network Unit) or a modem for xDSL (Digital Subscriber Line). When the state of the port-switching switch 230 is set to "Internet" in such a connection state, the communication device 10 conducts wireless communications with a station STA1 on the wireless LAN via the wireless LAN access point control circuit 174, as an access point for the station STA1. In the present connection mode, the station STA1 can access the Internet via the communication device 10 and the modem.

Furthermore, as shown in FIG. 5B, in a second connection mode, when the main unit 100 is not connected to the cradle 200, the communication device 10 conducts wireless communications with the station STA1 on the wireless LAN via the wireless LAN access point control circuit 174, as an access point for the station STA1. In addition, the communication device 10 conducts wireless communications with the public wireless LAN via the wireless LAN station control circuit 175 as a client of the public wireless LAN. In this connection mode, the station STA1 can access the Internet via the communication device 10 and the public wireless LAN.

Furthermore, as shown in FIG. 5(c), in a third connection mode, the main unit 100 is not connected to the cradle 200, and the communication device 10 conducts wireless communications with a mobile communication base station via the mobile communication control circuit 176 as a user equipment with regard to the mobile communication base station. In this connection mode, the station STA1 can access the Internet via the communication device 10 and the mobile communication base station.

Furthermore, as shown in FIG. 6, in a fourth connection mode, the main unit 100 is connected to the cradle 200, and the port 220 of the cradle 200 is connected to one end of a LAN cable LCa having the other end connected to a station STA2 of a wired LAN. In such a connection state, when the state of the port-switching switch 230 is set to "LAN", the communication device 10 conducts wireless communications with a mobile communication base station via the mobile communication control circuit 176 as a communication terminal with regard to the mobile communication base station. In this connection mode, the station STA2 can access the Internet via the communication device 10 and the mobile communication base station. It should be understood that, in the present connection mode, instead of conducting wireless communications with a mobile communication base station via the mobile communication control circuit 176 as a user equipment with regard to the mobile communication base station, the communication device 10 can also conduct wireless communications with the public wireless LAN via the wireless LAN station control circuit 175 as a client of the public wireless LAN.

As shown in FIG. 5 and FIG. 6, the communication device 10 according to the present embodiment can conduct wireless communications with the station STA1 in a state of being connected though wires with a modem at home or in office. In addition, when being away from home, the communication device 10 can also conduct wireless communications with the station STA1 in a state of being wirelessly connected to a public wireless LAN or a mobile communication base station. Furthermore, the communication device 10 can conduct wired communication with the station STA2 in a state of being wirelessly connected with a public wireless LAN or a mobile communication base station at home or in office. Thus, the communication device 10 can conduct wireless communications via various connection modes, and can improve convenience for the user.

Figure 7:
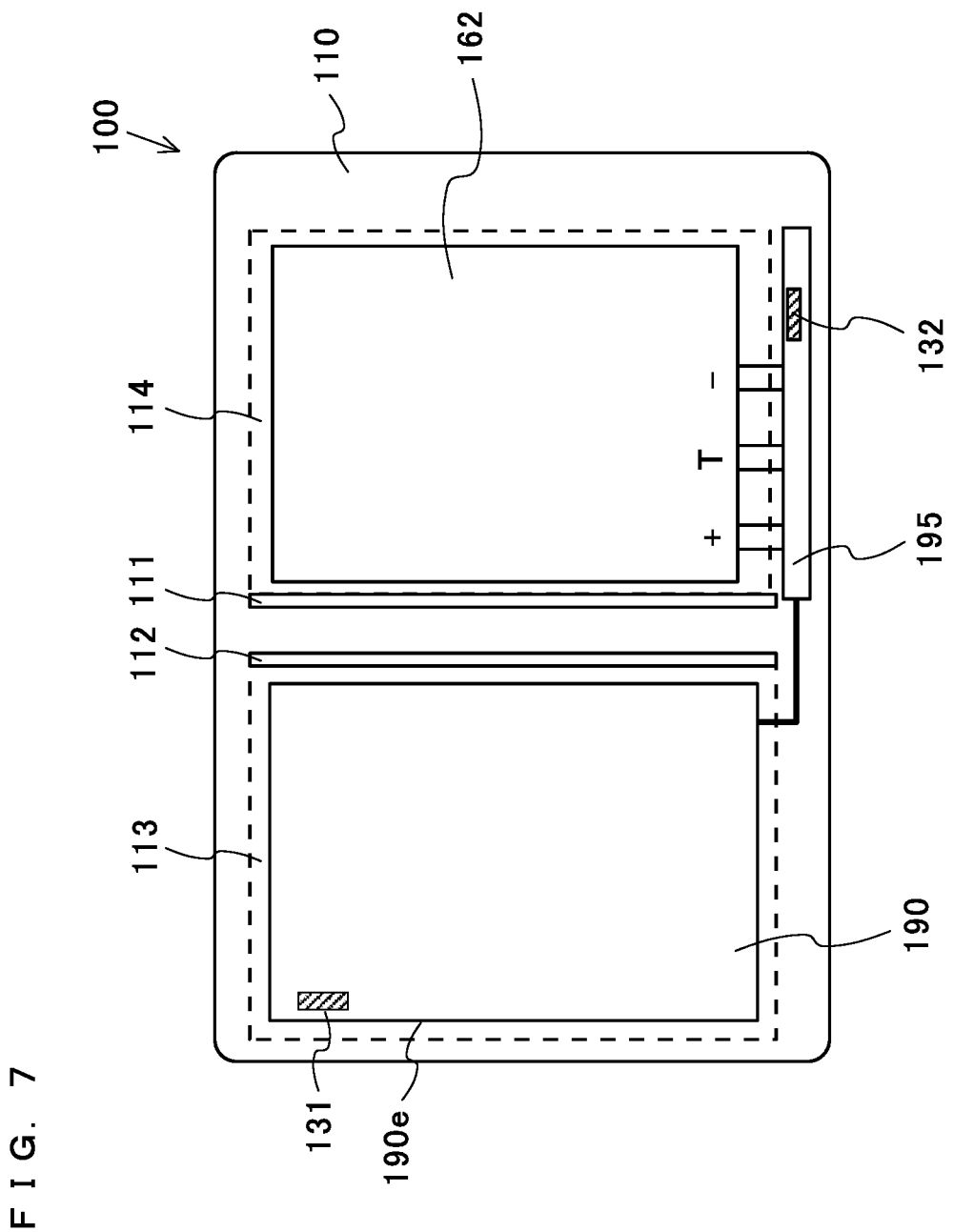
FIG. 7 is a diagram illustrating, in wireless communication devices involving embodiments of the present invention, the main unit, for configuring its internal layout.

FIG. 7 is a diagram illustrated to describe the internal configuration of the main unit 100 of the communication device 10 according to the present embodiment. The communication device 10 is constituted by the encasing of a mainboard 190, a sub-board 195, the battery 162 and associated components in a casing 110.

The casing 110 has a box-like outer shape. Near the middle of the interior space of the casing 110, a first partition wall 111 and a second partition wall 112, which partition the interior space in two, are formed in parallel. With the first partition wall 111 and the second partition wall 112, the interior space of the casing 110 is partitioned as a mainboard housing section 113 for housing the mainboard 190, and a battery housing section 114 for housing the battery 162. In other words, in the communication device 10, the mainboard housing section 113 and the battery housing section 114 are arranged having therebetween a layer of air formed between the two partition walls. Such a configuration enables the heat insulation effect of the layer of air to keeps heat from being transmitted from the mainboard housing section 113 to the battery housing section 114, and vice-versa.

The mainboard 190 has an approximately rectangular outer shape. The mainboard 190 includes the CPU 120, the ROM 171, the RAM 172, the battery control section 160, the USB device interface 173, the wireless LAN access point control circuit 174, the wireless LAN station control circuit 175, the mobile communication control circuit 176, the cradle connection interface 180, and the like. In addition, the mainboard 190 further includes the mainboard temperature detection section 131. On the mainboard 190, the mainboard temperature detection section 131 is disposed at an end portion in the vicinity of an edge 190e which is on the side opposite of an edge on which side the battery 162 is disposed.

As described above, by having the mainboard temperature detection section 131 disposed on the end portion of the mainboard 190, the influence of heat conveyed directly from the CPU 120 and the battery control section 160 can be minimized, and at the mainboard housing section 113, a temperature having a strong correlation with the temperature of the surface of the casing 110 can be detected. Although the mainboard temperature detection section 131 is disposed on the mainboard 190 in the present embodiment, it can be disposed on other locations as long as it is a position that can detect a temperature having a strong correlation with the temperature of the surface of the casing 110. For example, a configuration may be used in which the mainboard temperature detection section 131 is attached to the inner side of the casing 110, and in which the mainboard temperature detection section 131 and the mainboard 190 are connected with a flexible cable. With such a configuration, the mainboard temperature detection section 131 can detect a temperature having a strong correlation with the surface temperature of the casing 110.

The sub-board 195 has an approximately rectangular outer shape, and is disposed at a position adjacent to the battery housing section 114. The sub-board 195 includes the sub-board temperature detection section 132, and respective terminal sections connected to the plus terminal, the minus terminal, and the terminal T of the battery 162. Furthermore the sub-board 195 is electrically connected to the mainboard 190. According to this configuration, the sub-board temperature detection section 132 is disposed at a position adjacent to the battery housing section 114. Therefore, the sub-board temperature detection section 132 can detect the temperature of the battery housing section 114.

Figure 8:
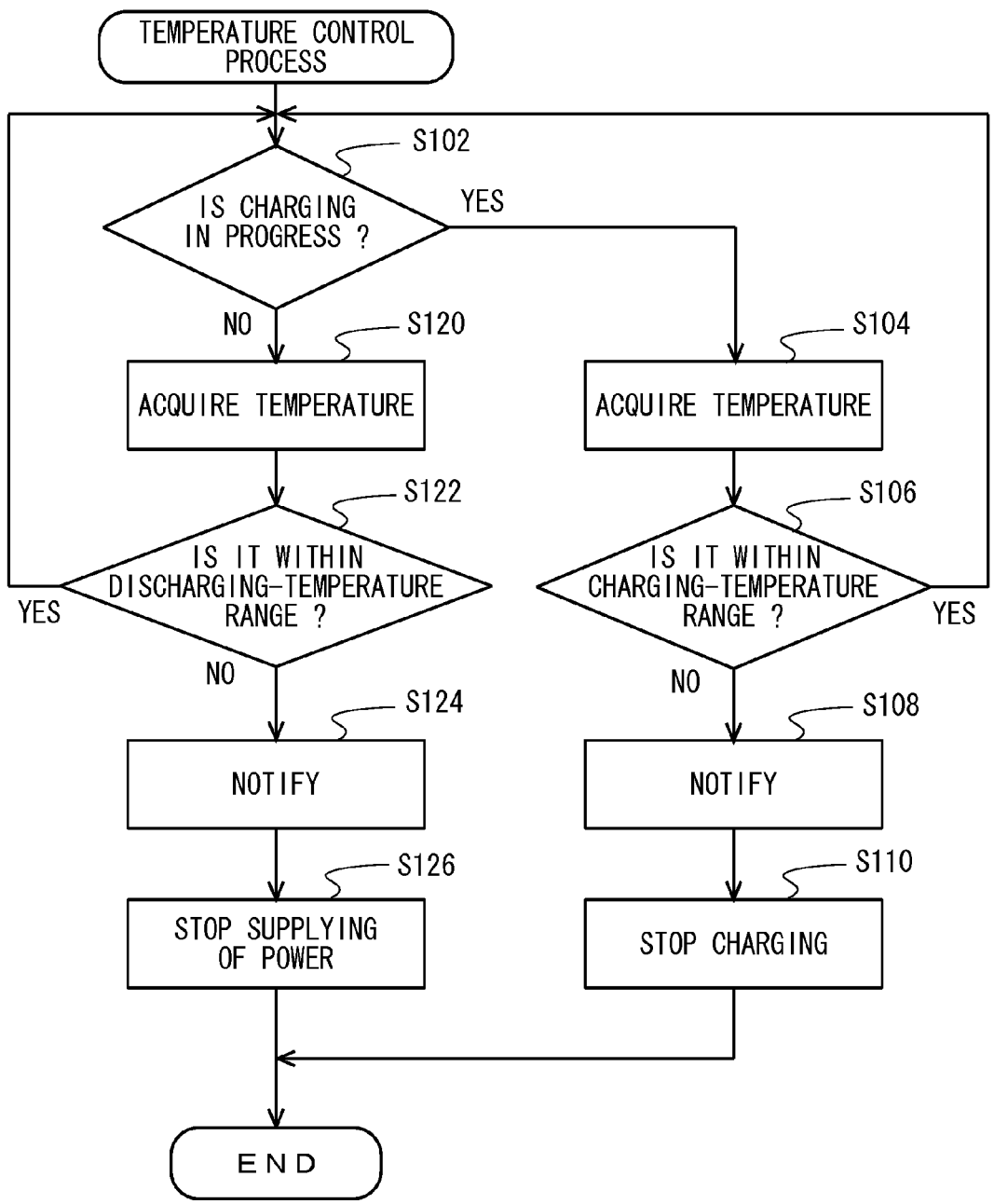
FIG. 8 is a flowchart representing the procedural flow of a temperature control process executed in a wireless communication device according to a first embodiment.

FIG. 8 is a flowchart representing the procedural flow of a temperature control process executed by the communication device 10 of the first embodiment. The temperature control process is initiated when the power of the communication device 10 is turned on. When the temperature control process is initiated, first, the temperature control section 123 determines whether or not the battery 162 is being charged (step S102).

When the battery 162 is being charged (step S102: YES), the temperature control section 123 acquires the temperatures detected by the mainboard temperature detection section 131 and the sub-board temperature detection section 132 (step S104). Specifically, by detecting each output signal outputted from the mainboard temperature detection section 131 and the sub-board temperature detection section 132, the temperature control section 123 acquires a temperature of the periphery of the mainboard 190 and a temperature of the periphery of the sub-board 195, which are detected by the mainboard temperature detection section 131 and the sub-board temperature detection section 132. In the present embodiment, the temperature of the periphery of the mainboard 190 detected by the mainboard temperature detection section 131 is referred to as a temperature T1 (° C.), and the temperature of the periphery of the sub-board 195 detected by the sub-board temperature detection section 132 is referred to as a temperature T2 (° C.).

Similarly, at step S104, the battery control section 160 acquires the temperature T3 of the battery 162 detected by the battery temperature detection section 164.

The temperature control section 123 determines whether or not the temperatures T1, T2 acquired at step S104 are both within a first charging-temperature range that is set in advance for charging-temperatures (step S106). The first charging-temperature range, which is set in advance for charging-temperatures, is an acceptable temperature range that is arbitrarily set as temperatures that do not result in defects when charging of the battery 162 is conducted. Specifically, the temperature control section 123 determines whether or not the temperature T1 is T1min≤T1≤T1max with respect to temperatures T1min and T1max (T1max≥T1min) which are arbitrarily set in advance, and whether or not the temperature T2 is T2min≤T2≤T2max with respect to temperatures T2min and T2max (T2max≥T2min) which are arbitrarily set in advance. It should be understood that, T1min and T2min may be identical values or may be different values. T1min and T2min can be set, for example, at a value around 0° C. Furthermore, T1max and T2max may be identical values or may be different values. T1max and T2max can be set, for example, at a value around 50° C.

Similarly, at step S106, the battery control section 160 determines whether or not the temperature T3 acquired from the battery temperature detection section 164 is within the predetermined second charging-temperature range.

When the temperatures T1 and T2 detected respectively by the mainboard temperature detection section 131 and the sub-board temperature detection section 132 are both within the first charging-temperature range (step S106: YES), the temperature control section 123 returns the process to step S102. Thus, when T1min≤T1≤T1max and T2min≤T2≤T2max are satisfied, acquiring of the temperatures T1, T2 from the mainboard temperature detection section 131 and the sub-board temperature detection section 132 will continue while determination is made whether or not the battery 162 is being charged.

When at least one of the temperatures T1 and T2 detected respectively by the mainboard temperature detection section 131 and the sub-board temperature detection section 132 is not within the first charging-temperature range (step S106: NO), the temperature control section 123 notifies the user of the communication device 10 that the temperature the battery is high due to the charging (step S108). Specifically, the temperature control section 123 instructs the display control section 122 to light up an indicator lamp that is in the display section 140 and is for indicating the high temperature of the battery 162.

In addition, the temperature control section 123 halts the charging of the battery 162 (step S110). As the method for halting the charging, a conventionally well-known arbitrary method may be used. For example, a method may be used in which the temperature control section 123 outputs a charger enable signal to the charger IC of the battery control section 160. The charger IC which has received the charger enable signal halts the supplying of power from the charger IC to the battery 162. When the battery control section 160 includes a switch for switching a power supply state between the charger IC and the battery 162, the temperature control section 123 may control this switch and may halt the supplying of power from the charger IC to the battery 162 by electrically disconnecting the charger IC and the battery 162. With this configuration, the supplying of power to the battery 162 can be halted even when there is a malfunction in the charger IC. It should be understood that, in FIG. 8, an example is shown in which the process at step S110 is executed after the process at step S108 has been executed; however, the execution sequence of the processes of step S108 and step S110 may be switched.

Similarly, when the temperature T3 acquired from the battery temperature detection section 164 is within the second charging-temperature range (step S106: YES), the battery control section 160 returns the process to step S102. On the other hand, when the temperature T3 acquired from the battery temperature detection section 164 is not within the second charging-temperature range (step S106: No), the battery control section 160 notifies the user of the communication device 10 that the temperature of the battery is high due to the charging (step S108), and halts the charging of the battery 162 (step S110).

Even when the battery 162 is not being charged (step S102: NO), the temperature control section 123 acquires the temperatures T1, T2 detected by the mainboard temperature detection section 131 and the sub-board temperature detection section 132 (step S120). Then, the temperature control section 123 determines whether or not the acquired temperature T1 is within a second discharging-temperature range that is set in advance, and whether or not the temperature T2 is within a first discharging-temperature range that is set in advance (step S122). The first discharging-temperature range and the second discharging-temperature range which are set in advance are temperature ranges that are arbitrarily set as temperature ranges that do not result in defects when discharging is conducted. It should be understood that, the first discharging-temperature range and the above described first charging-temperature range may be identical ranges or may be different ranges. In addition, the first discharging-temperature range and the second discharging-temperature range may be identical ranges or may be different ranges.

When the temperatures T1, T2 are both within the corresponding discharging-temperature ranges (step S122: YES), the temperature control section 123 returns the process to step S102. When at least one of the temperatures T1, T2 is not within the corresponding discharging-temperature ranges (step S122: NO), the temperature control section 123 notifies the user of the communication device 10 that the temperature of the main unit 100 is high (step S124). Specifically, the temperature control section 123 instructs the display control section 122 to light up an indicator lamp that is in the display section 140 of the communication device 10 and is for indicating the high temperature of the battery 162. Thus, when process sections such as the CPU 120 generate heat and are at high temperatures due to power supplied to such process sections from the battery 162, the user is notified about that.

Furthermore, when at least one of the temperatures T1, T2 is not within the corresponding discharging-temperature ranges (step S122: NO), the temperature control section 123 executes the process at step S124 and halts the supplying of power to the communication process section 121 (step S126). Specifically, in the present embodiment, the temperature control section 123 halts the supplying of power from the battery 162 to the CPU 120. As the method for halting the supplying of power to the CPU 120, a conventionally well-known arbitrary method may be used. For example, a method may be used in which the temperature control section 123 controls a switch interposed between the battery 162 and the CPU 120 and halts the supplying of power from the battery 162 to the CPU 120 by electrically disconnecting the battery 162 and the CPU 120. It should be understood that, if the communication process section 121 and the temperature control section 123 are included in different circuits, the temperature control section 123 may halt only the supplying of power to the circuit including the communication process section 121. In this case, even when the supplying of power to the communication process section 121 is halted, the temperature control section 123 can continue the temperature control process since power is supplied to the temperature control section 123. It should be understood that, in FIG. 8, an example is shown in which the process at step S126 is executed after the process at step S124 has been executed; however, the execution sequence of the processes of step S124 and step S126 may be switched.

With the above described communication device 10 according to the first embodiment, when the battery 162 is being charged and the temperature of the battery housing section 114 detected by the sub-board temperature detection section 132 is not within the first charging-temperature range, the charging of the battery 162 is halted. Therefore, the operation stability of the wireless communication device against the generation of heat can be improved. Specifically, since the charging can be halted when the battery 162 is at a temperature state that is not suitable for charging, functional deterioration and damages to the battery due to the generation of heat can be suppressed.

With the present invention, even if the battery temperature detection section 164 becomes defective, the operation stability of the communication device 10 against the generation of heat can be improved since the charging of the battery 162 can be halted by the temperature control section 123 based on the temperature detected by the sub-board temperature detection section 132.

In addition, when power is supplied from the battery 162 to the communication process section 121 and the temperature of the battery housing section 114 detected by the sub-board temperature detection section 132 is not within the first discharging-temperature range, the supplying of power to the communication process section 121 can be halted; therefore, the operation stability of the wireless communication device against the generation of heat can be improved. Specifically, when the temperature of the battery 162 becomes high due to the discharging, the discharging can be halted. Therefore, functional deterioration and damages to the battery due to the generation of heat can be suppressed.

Furthermore, by using the temperature detected by the sub-board temperature detection section 132, the communication device 10 according to the present invention controls both the charging of the battery 162 and the supplying power from the battery 162 to the communication process section 121. Therefore, it is more economical when compared to a case in which a control circuit and a temperature detection section for controlling the charging of the battery 162, and a control circuit and a temperature detection section for controlling the supplying of power to the communication process section 121 are separately provided; and the size of the communication device 10 can be reduced.

With the communication device 10 according to the first embodiment, the supplying of power to the communication process section 121 is halted when the battery 162 is supplying power to the communication process section 121 and the temperature of the mainboard housing section 113 detected by the mainboard temperature detection section 131 is not within the second discharging-temperature range. As a result, inconveniences during the use of the communication device associate with the generation of heat can be suppressed. More specifically, the communication process section 121 is generally used constantly in order to conduct the communication process, and the temperature of the CPU 120 can easily become high. Furthermore, in recent years, the circuits forming the communication process section 121 are becoming more complicated as the performance of the communication device 10 becomes higher, and the temperature of these circuits can easily become high. In addition, associate with the reduction in size of the communication device 10, internal circuits thereof are integrated and the temperature of the exterior surface of the communication device 10 tends to increase easily. When the temperature of the main unit 100 becomes extremely high, it can become less portable for the user. However, with the present invention, extreme increase in the temperature of the exterior surface of the communication device 10 can be suppressed, since the supplying of power to the communication process section 121 is halted when the temperature of the mainboard housing section 113 detected by the mainboard temperature detection section 131 is not within a predetermined range. Therefore, reduction in the portability of the main unit 100 for the user can be suppressed.

Furthermore, in the communication device 10 of the first embodiment, since the mainboard temperature detection section 131 and the sub-board temperature detection section 132 are disposed at different positions, the operation stability of the wireless communication device against the generation of heat can be improved with more certainty. Specifically, since reduction in size is required to have the communication device 10 portable, heat generation sources such as the battery 162 and the communication process section 121 are disposed inside the communication device 10 at different positions. Here, in the present invention, the mainboard temperature detection section 131 is disposed in the vicinity of the communication process section 121, and the sub-board temperature detection section 132 is disposed in the vicinity of the battery 162. Therefore, even when heat is generated at any one of the heat generation sources such as the battery 162 and the communication process section 121 disposed at different positions, the temperature increase of each of the heat generation sources can be precisely detected by corresponding temperature detection sections. Therefore, the generation of heat of the communication device 10 can be suppressed, and its operation stability can be improved with more certainty.

In addition, in the communication device 10 according to the first embodiment, the mainboard temperature detection section 131 is disposed at the end portion of the mainboard 190 on which the communication process section 121 is formed. By disposing the mainboard temperature detection section 131 at the end portion of the mainboard 190 away from the communication process section 121, influences of direct heat such as the radiant heat generated from the communication process section 121 can be suppressed. As a result, the mainboard temperature detection section 131 can detect an average temperature of the mainboard housing section 113, which has a strong correlation with the temperature of the exterior surface of the casing 110. Then, when the temperature detected by the mainboard temperature detection section 131 is not within the second discharging-temperature range, increase in the temperature of the exterior surface of the communication device 10 can be suppressed by halting the supplying of power to the communication process section 121.

In the first embodiment, in order to suppress the temperature increase of the communication device 10, the temperature control section 123 is configured to conduct a control of either halting the charging of the battery 162 or halting the supplying of power to the communication process section 121. However, the controls to suppress the temperature increase of the communication device 10 are not limited to those described above. Described in a second embodiment is a configuration that conducts, in a temperature control process, a control other than these controls. When compared to the communication device 10 according to the first embodiment, only a part of the content of the temperature control process is different in a communication device 10 of the second embodiment, and description of similar configurations will be omitted.

Figure 9:
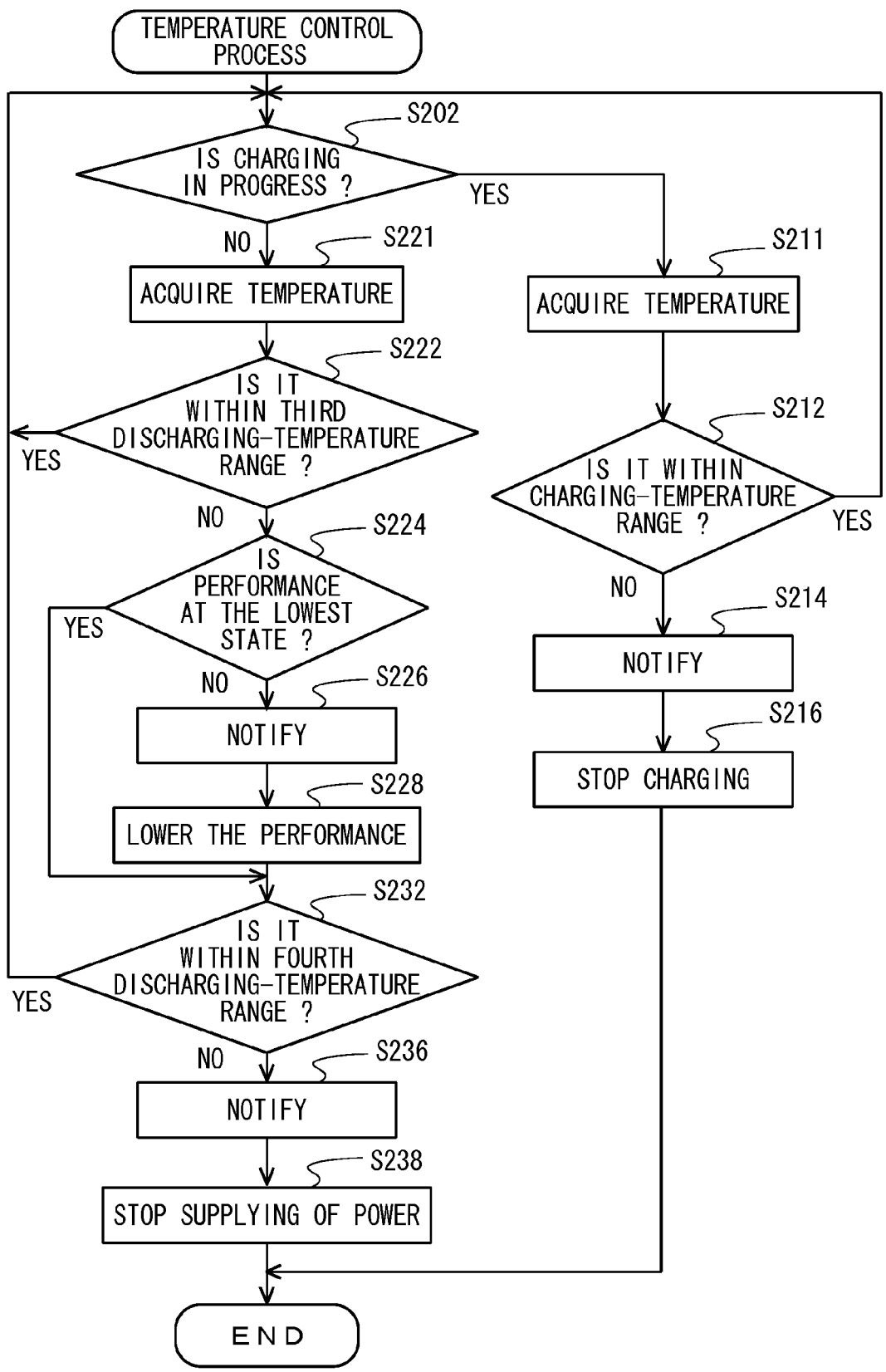
FIG. 9 is a flowchart representing the procedural flow of a temperature control process executed in a wireless communication device according to a second embodiment.

FIG. 9 is a flowchart representing the procedural flow of the temperature control process executed by the communication device 10 of the second embodiment. In the temperature control process of the second embodiment, first, the temperature control section 123 determines whether or not the battery 162 is being charged (step S202).

When the battery 162 is being charged (step S202: YES), the temperature control section 123 acquires the temperatures T1, T2 detected by the mainboard temperature detection section 131 and the sub-board temperature detection section 132 (step S211). Then, the temperature control section 123 determines whether or not the temperatures T1, T2 are both within the predetermined first charging-temperature range (step S212). Similarly to the first embodiment, the first charging-temperature range here can be arbitrarily set in advance.

Similarly, when the battery 162 is being charged (step S202: YES), the battery control section 160 acquires the temperature T3 of the battery 162 detected by the battery temperature detection section 164 (step S211). Then, the battery control section 160 determines whether or not the temperature T3 is within in the predetermined second charging-temperature range (step S212).

When the temperatures T1 and T2 detected respectively by the mainboard temperature detection section 131 and the sub-board temperature detection section 132 are both within the first charging-temperature range (step S212: YES), the temperature control section 123 returns the process to step S202. On the other hand, when at least one of the temperatures T1 and T2 detected respectively by the mainboard temperature detection section 131 and the sub-board temperature detection section 132 is not within the first charging-temperature range (step S212: NO), similar to the first embodiment, the temperature control section 123 notifies the user that the temperature of the battery is high (step S214), and halts the charging of the battery 162 (step S216). It should be understood that, in FIG. 9, an example is shown in which the process at step S216 is executed after the process at step S214 has been executed; however, the execution sequence of the processes of step S214 and step S216 may be switched.

Similarly, when the temperature T3 acquired from the battery temperature detection section 164 is within the second charging-temperature range (step S212: YES), the battery control section 160 returns the process to step S202. On the other hand, when the temperature T3 acquired from the battery temperature detection section 164 is not within the second charging-temperature range (step S212: No), the battery control section 160 notifies the user of the communication device 10 that the temperature of the battery is high due to the charging (step S214), and halts the charging of the battery 162 (step S216).

When the battery 162 is not being charged (step S202: NO), the temperature control section 123 acquires the temperatures T1, T2 detected by the mainboard temperature detection section 131 and the sub-board temperature detection section 132 (step S221), and determines whether or not the acquired temperatures T1, T2 are both within a predetermined third discharging-temperature range (step S222). Similarly to the first discharging-temperature range and the second discharging-temperature range described in the first embodiment, the third discharging-temperature range can be arbitrarily set in advance, and may be a range identical or different from the first charging-temperature range which is used to determine whether charging is in progress at step S212. In the present embodiment, the third discharging-temperature range for the temperature T1 is defined as T1Amin≤T1≤T1Amax (T1Amax≥T1Amin), and the third discharging-temperature range for the temperature T2 is defined as T2Amin≤T2≤T2Amax (T2Amax≥T2Amin).

When the temperatures T1, T2 are both within the third discharging-temperature range (step S222: YES), the temperature control section 123 returns the process to step S202. When at least one of the temperatures T1, T2 is not within the third discharging-temperature range (step S222: NO), the temperature control section 123 determines whether or not the performance of the communication device 10 is at a lowest state due to a control at step S228 described later (step S224). Specifically, with regard to the one or more controls that are for lowering the performance of the communication device 10 and that are set in advance, the temperature control section 123 determines whether or not all the set controls have been executed. When all the controls are executed, it is determined that the performance of the communication device 10 is in a lowest state; and when there is a control that is not executed, it is determined that the performance of the communication device 10 is not in the lowest state. Specific examples of the controls for lowering the performance of the communication device 10 will be described later.

When the performance of the communication device 10 is in the lowest state (step S224: YES), the temperature control section 123 skips step S232 which is described later. When the performance of the communication device 10 is not in the lowest state (step S224: NO), the temperature control section 123 notifies the user of the communication device 10 that the performance of the communication device 10 will be lowered (step S226), and conducts a control for lowering the performance of the communication device 10 (step S228).

Here, "controls to lower the performance of the communication device 10" refers to controls for lowering a packet transferring performance in order to suppress power consumption of the communication device 10. Specifically, such controls include a control for lowering the clock frequency of the CPU 120, a control for reducing the output power of the wireless signal, a control for reducing a wireless link velocity, and the like. It should be understood that, in FIG. 9, an example is shown in which the process at step S228 is executed after the process at step S226 has been executed; however, the execution sequence of the processes of step S226 and step S228 may be switched.

After conducting the control for lowering the performance of the communication device 10, the temperature control section 123 determines whether or not the temperatures T1, T2 are both within a fourth discharging-temperature range (step S232). The fourth discharging-temperature range is a temperature range arbitrarily set in advance for each of the temperatures T1 and T2 so as to include the third discharging-temperature range. Specifically, the fourth discharging-temperature range for the temperature T1 is defined as $T1Bmin \le T1 \le T1Bmax$ ($T1Bmax \ge T1Bmin$); the fourth discharging-temperature range for the temperature T2 is defined as $T2Bmin \le T2 \le T2Bmax$ ($T2Bmax \ge T2Bmin$); and the relationships between the fourth discharging-temperature range and the third discharging-temperature range are $T1Bmin \le T1Amin \le T1Amax \le T1Bmax$ and $T2Bmin \le T2Amin \le T2Amax \le T2Bmax$.

When the temperatures T1, T2 are both within the fourth discharging-temperature range (step S232: YES), the temperature control section 123 returns the process to step S202. When at least one of the temperatures T1, T2 is not within the fourth discharging-temperature range (step S232: NO), similarly to the first embodiment, the temperature control section 123 notifies the user that the temperature of the main unit 100 is high due to operations (step S236), and halts the supplying of power to the communication process section 121 (step S238). It should be understood that, as described in the first embodiment, if the communication process section 121 and the temperature control section 123 are included in different circuits, the temperature control section 123 may halt only the supplying of power to the circuit including the communication process section 121.

As described above, with the communication device 10 of the second embodiment, the operation stability of the communication device 10 against the generation of heat can be improved, by conducting a control that can suppress an increase in the temperature when the temperature detected by the temperature detection section is not within the third discharging-temperature range. Furthermore, the process for reducing the temperature of the communication device 10 is not limited to halting the charging of the battery and halting the supplying of power from battery, and any process can be used.

It should be understood that, the present invention is not limited to the embodiments described above, and various other modes can be devised without departing from the gist and scope of the invention; and for example, a modification described next can also be applied.

The configurations of the communication device 10 in each of the above described embodiments are merely examples, and various modifications can be made. For example, the communication device 10 may include only the sub-board temperature detection section 132 and not include the main-board temperature detection section 131. The above described control processes shown in FIG. 8 and FIG. 9 can also be conducted in such a case, and the operation stability of the communication device 10 against the generation of heat can be improved sufficiently.

Furthermore, in the embodiments described above, although the described example is one in which the communication device 10 includes the battery temperature detection section 164, the communication device 10 may have a configuration that does not include the battery temperature detection section 164. Thus, according to the present invention, even when the communication device 10 does not include the battery temperature detection section 164, a temperature increase of the battery can be detected by the sub-board temperature detection section 132. Therefore, the communication device 10 can conduct the control for suppressing the temperature increase and can improve its own operation stability against the generation of heat.

Furthermore, in the embodiments described above, although the communication device 10 includes the cradle 200, a configuration in which the communication device 10 does not include the cradle 200 can also be realized.

Furthermore in the embodiments described above, although the communication device 10 does not include a fan for cooling the mainboard 190, a configuration may be used in which the communication device 10 includes a fan and rotates the fan in accordance with the detection result of the temperature detection section. The operation stability of the communication device against the generation of heat can be improved also with this configuration.

Furthermore, for the embodiments described above, a part of the configurations achieved by hardware can be substituted with software, or a part of the configurations achieved by software can be substituted with hardware.

The temperature control process in the embodiments above is described as to end the process when the charging of the battery 162 is halted (FIG. 8: step S110, FIG. 9: step S216) and when the supplying of power to the communication process section 121 is halted (FIG. 8: step S126, FIG. 9: step S238). However, even after the charging of the battery 162 is halted or after the supplying of power is halted, a configuration may be used in which the temperature control section 123 continues monitoring the temperature, and restarts charging and supplying of power when temperatures detected at each of the detection sections enter the corresponding ranges.

In the temperature control process in the embodiments described above, the temperature control section 123 halts the charging of the battery 162 (FIG. 8: step S110, FIG. 9: step S216) and halts the supplying of power to the communication process section 121 (FIG. 8: step S126, FIG. 9: step S238) when any one of the temperature T1 detected by the mainboard temperature detection section 131 and the temperature T2 detected by the sub-board temperature detection section 132 is not within a predetermined range. However, the temperature control section 123 may conduct a control so as to block supplying of power to a corresponding heat generation source, in accordance with a determination result of only either one of the temperatures T1 or T2. For example, a configuration may be used in which the temperature control section 123 halts the charging of the battery 162 only when the temperature T2 detected by the sub-board temperature detection section 132 is not within the predetermined range, and the temperature control section 123 halts the supplying of power to the communication process section 121 only when the temperature T1 detected by the mainboard temperature detection section 131 is not within the predetermined range.

For the temperature control process in the embodiments described above, although a pair consisting of an upper limit value and a lower limit value is set for each of the predetermined ranges, a predetermined range may be defined by only either an upper limit value or a lower limit value alone.

While the invention has been described in detail, the foregoing description is in all aspects illustrative and not restrictive. It will be understood that numerous other modifications and variations can be devised without departing from the scope of the invention.

What is claimed is:

1. A communication device for utilization in a communication network, the communication device comprising:
   a communication process section for controlling communications in the communication network;
   a battery for supplying power to the communication process section;
   a battery control section for controlling the supplying of power to the battery;
   a first temperature detection section for detecting temperature of a battery housing section housing the battery;
   a temperature control section for, (A) when the battery is being charged and the temperature detected by the first temperature detection section is not within a predetermined first charging-temperature range, controlling the battery control section to halt the charging of the battery, and (B) when power is supplied from the battery to the communication process section and the temperature detected by the first temperature detection section is not within a predetermined first discharging-temperature range, halting the supplying of power from the battery to the communication process section; and
   a second temperature detection section for detecting temperature of the battery, wherein the battery control section, when the battery is being charged and the temperature detected by the second temperature detection section is not within a predetermined second charging-temperature range, halts the charging of the battery.

2. The communication device according to claim 1, further comprising a third temperature detection section for detecting temperature of a communication-process substrate housing section in which a substrate on which the communication process section is constituted is housed, wherein the temperature control section, when power is supplied from the battery to the communication process section and the temperature detected by the third temperature detection section is not within a predetermined second discharging-temperature range, halts the supplying of power from the battery to the communication process section.

3. The communication device according to claim 2, wherein the first temperature detection section is disposed on a sub-board on which a connection terminal connected to the battery is formed, and the third temperature detection section is disposed on a mainboard end portion where electronic components constituting the communication process section are situated.

4. A method for controlling a communication device utilized in a communication network and comprising a communication process section for controlling communications in the communication network, a battery for supplying power to the communication process section, and a temperature detection section for detecting temperature of a battery housing section housing the battery, the method including:
   a step of determining whether the battery is being charged;
   a step of determining whether the temperature detected by the temperature detection section is within a predetermined range that is pre-established in terms of the charging temperature;
   a step, if the battery is being charged and the temperature detected by the temperature detection section is not within a charging-temperature range that is pre-established in terms of the charging temperature, of halting the charging of the battery;
   a step, if power is supplied from the battery to the communication process section and the temperature detected by the temperature detection section is not within a discharging-temperature range that is pre-established in terms of the discharging temperature, of halting the supplying of power from the battery to the communication process section;
   detecting temperature of the battery by a second temperature detection section; and
   halting the charging of the battery when the battery is being charged and the temperature detected by the second temperature detection section is not within a predetermined second charging-temperature range.

5. A portable, rechargeable, wirelessly operable network telecommunications device comprising:
   a main unit housing a mainboard;
   a telecommunications processor on the mainboard, for carrying out and controlling network telecommunications functions of the device;
   a battery housing in the main unit;
   a rechargeable battery housed in the battery housing, the battery for supplying power to the telecommunications processor;
   a battery control section in the main unit, for controlling charging and discharging of the battery;
   temperature-detecting means in the main unit, for detecting temperatures of the battery and its environs;
   a cradle into which the main unit is detachably connectable, the cradle configured for supplying power from an external power source to at least the telecommunications processor in the main unit, and to the battery via the battery control section to thereby charge the battery, when the main unit is connected into the cradle and the cradle is connected to the external power source;
   a temperature control section in the main unit, the temperature control section responsive to the temperature-detecting means and configured to control the battery control section in such a way that
      when the main unit is connected into the cradle and the cradle is connected to an external power source, such that the battery is being charged, if the temperatures detected by the temperature-detecting means are not within predetermined charging-temperature ranges, the battery control section halts charging of the battery, and
      when the main unit is either detached from the cradle or is connected into the cradle but the cradle is not connected to an external power source, such that the battery discharges to supply power to the telecommunications processor, if the temperatures detected by the temperature-detecting means are not within predetermined discharging-temperature ranges, the battery control section halts the supplying of power to the telecommunications processor.

6. In a portable, rechargeable network telecommunications device comprising a main unit housing a mainboard, a telecommunications processor on the mainboard, a rechargeable battery housed in a main-unit battery housing and discharging to supply power to the telecommunications processor, a battery control section in the main unit, a temperature-detecting means in the main unit, and a cradle, into which the main unit is detachably connectable, for supplying power from an external power source to at least the telecommunications processor in the main unit, and to the battery via the battery control section to thereby charge the battery, when the main unit is connected into the cradle and the cradle is connected to the external power source, a temperature-control method comprising:

a charge-detecting step of detecting via the battery control section whether the battery is being charged via the cradle, or is discharging to supply power to the telecommunications processor;

a temperature-detecting step of detecting temperatures of the battery and its environs;

a battery-charging control step, responsive to said charge-detecting step and said temperature-detecting step, of halting, via the battery control section, charging of the battery if the temperatures detected in said temperature-detecting step are not within predetermined charging-temperature ranges; and a battery-discharging control step, responsive to said charge-detecting step and said temperature-detecting step, of halting, via the battery control section, the supplying of power to the telecommunications processor if the temperatures detected in said temperature-detecting step are not within predetermined discharging-temperature ranges.

* * * * *